(12) United States Patent
Crovetto et al.

(10) Patent No.: US 6,570,591 B1
(45) Date of Patent: May 27, 2003

(54) VISUAL SYNTAX BUILDER FOR SPACE VEHICLE CONTROL

(75) Inventors: Alexis J. Crovetto, Melbourne, FL (US); Douglas M. Dyer, Indialantic, FL (US); Albert T. Montroy, Melbourne, FL (US)

(73) Assignee: Harris-Exigent, Inc., Melbourne, FL (US)

( * ) Notice: Subject to any disclaimer, the term of this patent is extended or adjusted under 35 U.S.C. 154(b) by 0 days.

(21) Appl. No.: 09/495,547

(22) Filed: Feb. 1, 2000

(51) Int. Cl.[7] ................................................. G09G 5/00
(52) U.S. Cl. ........................ 345/763; 345/762; 345/967
(58) Field of Search .............................. 345/762, 763, 345/967, 968; 717/11

(56) References Cited

U.S. PATENT DOCUMENTS

| | | |
|---|---|---|
| 5,185,857 A | 2/1993 | Rozmanith et al. .......... 707/507 |
| 5,659,350 A | 8/1997 | Hendricks et al. .......... 725/116 |
| 5,675,752 A | 10/1997 | Scott et al. ................. 345/866 |
| 5,706,334 A | 1/1998 | Balk et al. ................ 379/88.13 |
| 5,740,037 A | 4/1998 | McCann et al. ............... 700/90 |
| 5,745,710 A | 4/1998 | Clanton, III et al. ......... 725/60 |
| 5,781,247 A | 7/1998 | Wehmeyer et al. .......... 348/569 |
| 5,802,255 A | 9/1998 | Hughes et al. ................. 706/59 |
| 5,802,492 A | 9/1998 | DeLorme et al. ............ 455/456 |
| 5,835,156 A | 11/1998 | Blonstein et al. .............. 725/38 |
| 5,870,741 A | 2/1999 | Kawabe et al. ................. 707/5 |
| 5,872,589 A | 2/1999 | Morales ........................ 725/24 |
| 5,880,768 A | 3/1999 | Lemmons et al. ............. 725/41 |
| 5,909,439 A | 6/1999 | Kuwabara et al. .......... 370/389 |
| 5,920,477 A | 7/1999 | Hoffberg et al. ............. 382/181 |
| 5,940,739 A | 8/1999 | Conrad et al. ............. 455/13.1 |
| 5,955,988 A | 9/1999 | Blonstein et al. ........... 342/359 |
| 5,956,024 A | 9/1999 | Strickland et al. .......... 345/717 |
| 6,113,649 A | * 9/2000 | Govindaraj ................. 717/113 |

* cited by examiner

*Primary Examiner*—Ba Huynh
(74) *Attorney, Agent, or Firm*—Akerman Senterfitt

(57) ABSTRACT

A method for graphically assisting system commanding can comprise the steps of: receiving a user-specified command; retrieving from a command database a command template corresponding to the specified command, the command template including at least one operational parameter corresponding to the specified command; for each retrieved operational parameter in the command template, adding to a graphical user interface (GUI) a GUI element corresponding to characteristics of the operational parameter; and, displaying the GUI. The user interface elements can include drop down boxes, sliders and text fields. The method can further comprise the steps of: for each GUI element in the GUI, accepting a value; and, formatting a command string containing the accepted values.

33 Claims, 4 Drawing Sheets

VISUAL SYNTAX BUILDER FOR SPACE VEHICLE CONTROL

CROSS REFERENCE TO RELATED APPLICATIONS (Not Applicable)

STATEMENT REGARDING FEDERALLY SPONSORED RESEARCH OR DEVELOPMENT (Not Applicable)

BACKGROUND OF THE INVENTION

1. Technical Field

This invention relates to the field of command and control systems and more particularly to a visual syntax builder for space vehicle control.

2. Description of the Related Art

Command and control systems can be used to control devices, for example specialized test equipment or software and hardware simulators. In the field of satellite command and control, space vehicle control systems can be used to command a satellite or satellite subsystems contained within the satellite, or ground equipment in the communication path between the satellite and the commanding system. In general, however, a space vehicle control system can command any device controllable by formatted commands communicated by the space vehicle control system to the target device.

A prototypical space vehicle control system generally can include a selection of commands for controlling the target device. In addition, the prototypical space vehicle control system can include a command formatting engine for appropriately formatting a chosen command with corresponding operational parameters in order to provide to the target device a valid command in a valid format. Finally, the prototypical space vehicle control system can include a command transmission module for physically transmitting formatted commands to the target device and for ensuring the receipt and acknowledgment by the target device of the formatted commands.

Presently, space vehicle control systems can process proprietary commanding languages. Using the proprietary commanding language, a user of a space vehicle control system can control a target device without learning the complexities of the internal command structure of the target device. Specifically, the space vehicle control system can convert a selected command formed using the proprietary commanding language into a command recognizable by the target device. Depending upon the target device, each recognizable command can include a variety of operational parameters.

Still, there exist fundamental problems with present space vehicle control systems. Present space vehicle control systems are prone to user error when a user specifies a command to be transmitted to a space vehicle. Specifically, each proprietary command can include a variety of operational parameters. Often, the user can fail to specify or mis-specify appropriate operational parameters included as part of a specified command. Given the complexity of present space vehicle control systems, the associated multiplicity of available commands and the multiplicity of corresponding operational parameters, presently, users must either rely upon memory or refer to appropriate documentation to determine a valid form for a selected command.

SUMMARY OF THE INVENTION

The invention concerns a visual syntax builder for providing a graphical assist for formatting commands in a command and control system. The inventive method can include several steps. Specifically, a method for graphically assisting system commanding can comprise the steps of: receiving a user-specified command; retrieving from a command database a command template corresponding to the specified command, the command template including at least one operational parameter corresponding to the specified command; for each retrieved operational parameter in the command template, adding to a graphical user interface (GUI) a GUI element corresponding to characteristics of the operational parameter; and, displaying the GUI. The user interface elements can include drop down boxes, sliders and text fields. The method can further comprise the steps of: for each GUI element in the GUI, accepting a value; and, formatting a command string containing the accepted values.

With regard to the command database, in addition to a command, each command template stored in the command database can have a data type for each operational parameter. Notably, the characteristics upon which the user interface element is chosen can include the data type. Additionally, the command template can have an indication of valid values for each operational parameter. Likewise, the characteristics upon which the user interface element is chosen can include the indication of valid values.

In the preferred embodiment, the command can be a command selected from the group consisting of a command for externally commanding a target device and a directive for internally commanding the command and control system. Additionally, the method can further comprise the step of choosing to perform the retrieving step using either a command database having stored therein the commands for externally commanding a target device or a directive database having stored therein the directives for internally commanding the command and control system. Where a user has chosen to perform the retrieving step using a command database, the method can further comprising attaching to a command database associated with a particular target device.

In the preferred embodiment, the accepting step can comprise the steps of: retrieving a list of commands from the command database; displaying the list in the GUI; and, permitting the user to select one of the commands in the list. Once selected, the appropriate GUI elements can be added to the GUI. Subsequently, the user can provide values for the operational parameters using the GUI elements. Using the provided values, a formatted command string can be produced. Advantageously, the method can further comprise the step of visually presenting the formatted command string to the user. Moreover, the method can comprise the step of automatically executing the formatted command string.

A system for graphically assisting the formatting of a command string in a command and control system can comprise: a command database for storing commands, at least one of the stored commands having at least one operational parameter; a graphical user interface (GUI); and, at least one GUI element selected for addition to the GUI for accepting a value corresponding to an operational parameter associated with a selected command in the command database. The GUI element can be selected from the group consisting of drop down boxes, sliders and text fields.

In the system, the GUI element can be selected according to characteristics of the corresponding operational parameter. Additionally, the system can comprise a command formatter for formatting a command string containing the command and the accepted command value. Moreover, the system can comprise a GUI for visually presenting the formatted command string to a user. Similarly, the system can further comprise means for automatically executing the formatted command string.

The command database can comprise command templates, each command template comprising a command and at least one operational parameter corresponding to the command. Notably, the commands stored in the command database can be commands selected from the group consisting of commands for externally commanding a target device and directives for internally commanding the command and control system. In addition, the command template stored in the command database can further comprise a data type for each operational parameter. Furthermore, the characteristics upon which the GUI element is selected can include the data type. Also, the command template can further comprise an indication of valid values for each operational parameter. Again, the characteristics upon which the GUI element is chosen can include the indication of valid values.

Significantly, each dialog box, prior to display, dynamically can conform itself to the chosen directive resulting in an optimum assist to the user. More particularly, each dialog box can be dynamically formed according to the number and type of parameters to be supplied with the chosen directive. Thus, the inventive method dynamically can map a specification to a set of formal rules. Essentially, the method is a graphical tool for creating a specification based on a formal rule.

In a command and control system, a method of dynamically conforming a GUI to a specified command and corresponding operational parameters can comprise the steps of: retrieving from a command database a record comprising a specified command and at least one operational parameter; dynamically assembling a GUI according to the retrieved record by adding to the GUI for each operational parameter in the record a GUI element corresponding to characteristics of the operational parameter; and, displaying the GUI. The user interface elements can comprise drop down boxes, sliders and text fields.

In the preferred embodiment, the command can be selected from the group consisting of a command for externally commanding a target device and a directive for internally commanding the command and control system. Thus, the method can include the step of choosing to perform the retrieving step using either a command database having stored therein the commands for externally commanding a target device or a directive database having stored therein the directives for internally commanding the command and control system. Where a command database rather than a directive database is chosen, the method can further include the step of attaching to a command database associated with a particular target device.

The record can further comprise a data type for each operational parameter. In that case, the characteristics upon which the user interface element is chosen include the data type. Additionally, the record further can comprise an indication of valid values for each operational parameter. In that case, the characteristics upon which the user interface element is chosen include the indication of valid values.

BRIEF DESCRIPTION OF THE DRAWINGS

There are presently shown in the drawings embodiments which are presently preferred, it being understood, however, that the invention is not limited to the precise arrangements and instrumentalities shown.

DETAILED DESCRIPTION OF THE INVENTION

A visual syntax builder can be used for graphically assisting a user in entering directives and commands in a space vehicle control system. Unlike a command line driven interface, a visual syntax builder in accordance with the inventive arrangements can reduce directive and command input errors. Furthermore, the graphical presentation of the visual syntax builder can better represent options available for use with a particular command or directive.

A visual syntax builder in accordance with the inventive arrangements can be implemented in a computer system using commercially available software development tools for example the GNU C compiler. The computer system can be preferably comprised of a computer including a central processing unit (CPU), one or more memory devices and associated circuitry. The computer system can further include at least one user interface display unit such as a video data terminal (VDT) operatively connected to the computer. The CPU can be comprised of any suitable microprocessor or other electronic processing unit, as is well known to those skilled in the art. An example of such a CPU would include the Pentium or Pentium II brand microprocessor available from Intel Corporation or any similar microprocessor. The various hardware requirements for the computer system as described herein can generally be satisfied by any one of many commercially available high speed personal computers and workstations offered by manufacturers such as International Business Machines Corporation and Sun Microsystems, Inc.

Figure 1:
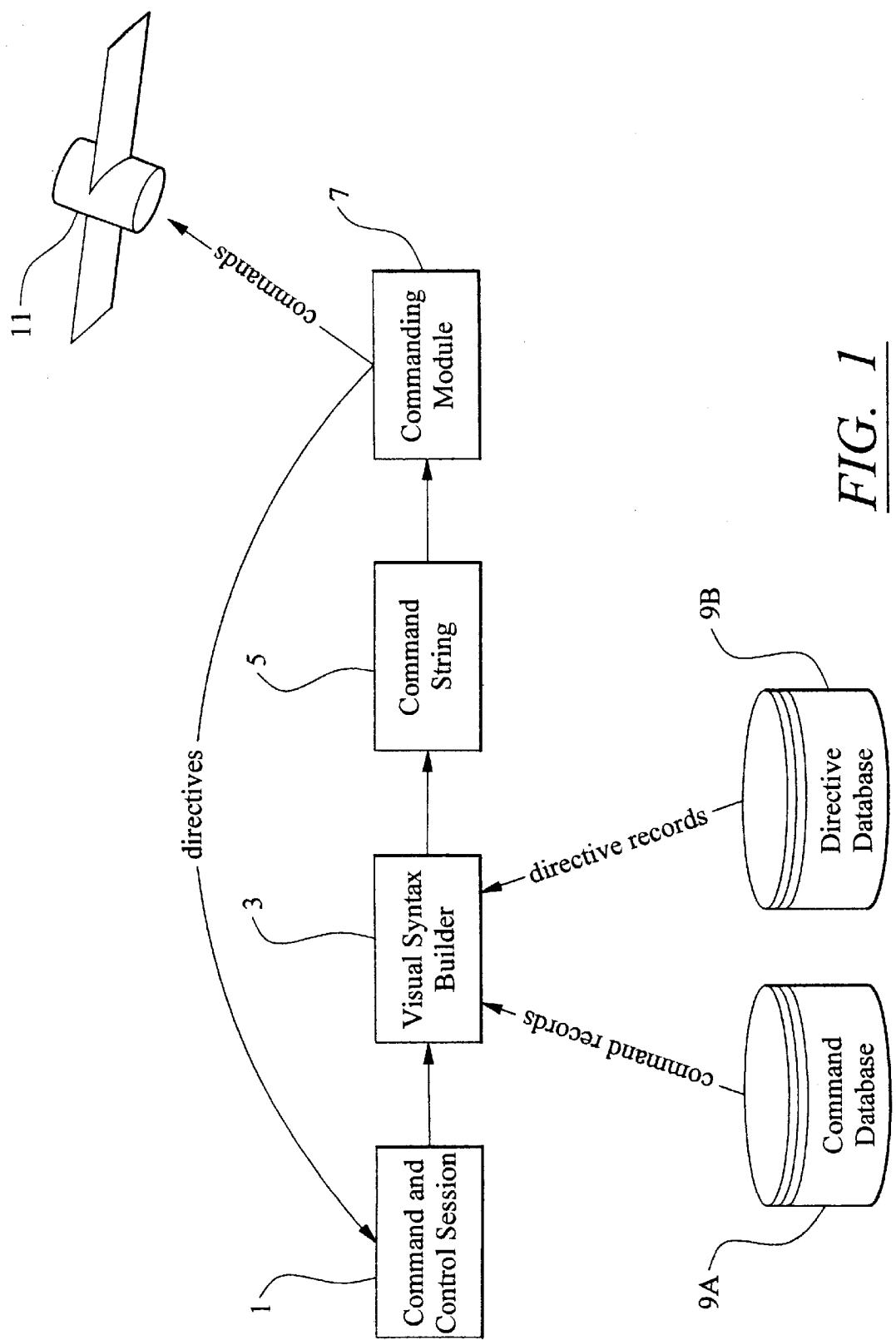
FIG. 1 is a schematic representation of a visual syntax builder incorporated in a space vehicle command and control system.

FIG. 1 illustrates a space vehicle command and control system incorporating a visual syntax builder in accordance with the inventive arrangements. As shown in FIG. 1, during a space vehicle command and control session 1, a user can invoke the visual syntax builder 3 in order to obtain graphical assistance in preparing and entering either a directive or command. As will be apparent to one skilled in the art, directives differ from commands in that directives control facilities internal to the space vehicle command and control system, whereas commands control facilities internal to target devices.

Generally, the user can directly prepare and enter a directive or command using command line facilities (not shown) included with the command and control session 1. Each directive or command can include corresponding operational parameters for further defining the command. As an example, an operational parameter can include a value indicating a number of times to perform an operation.

Nevertheless, often the sheer number of available directives and commands associated with a space vehicle command and control system, in addition to an equally overwhelming number of corresponding operational parameters, can result in the user mis-specifying or omitting operational parameters corresponding to a specified directive or command. In consequence, the visual syntax builder 3 can assist the user in specifying both a directive or command, and appropriate corresponding operational parameters. Ultimately, the visual syntax builder 3 can cause the formatting of the specified directive or command and corresponding operational parameters into a command string 5.

Advantageously, at the user's request, the formatted and prepared command string 5 either can be viewed by the user prior to execution, or automatically executed. If the user chooses to automatically execute the formatted and prepared command string 5, the command string 5 can be provided to a commanding module 7 for ultimate transmission either to the space vehicle command and control system, in the case of a directive, or the target device 11, in the case of a command. Otherwise, the user remains responsible for manually directing the visual syntax builder 3 to provide the formatted and prepared command string 5 to the commanding module 7.

When invoked by a user, prior to displaying the visual syntax builder 3, the visual syntax builder 3 can permit the user to choose whether to view all available directives associated with the space vehicle command and control system or all available commands associated with a currently attached database of commands particular to a target device. In the preferred embodiment, all directives associated with the space vehicle command and control system can be stored in a directive database 9B. In contrast, preferably only those commands associated with the particular target device 11 are grouped in the command database 9A. Specifically, each target device can have a corresponding command database for storing commands particular to the target device. As a result, in order to command a particular target device 11, in the preferred embodiment, first the user can identify the command database 9A corresponding to the particular target device 11 by attaching to the command database 9A.

Figure 2:
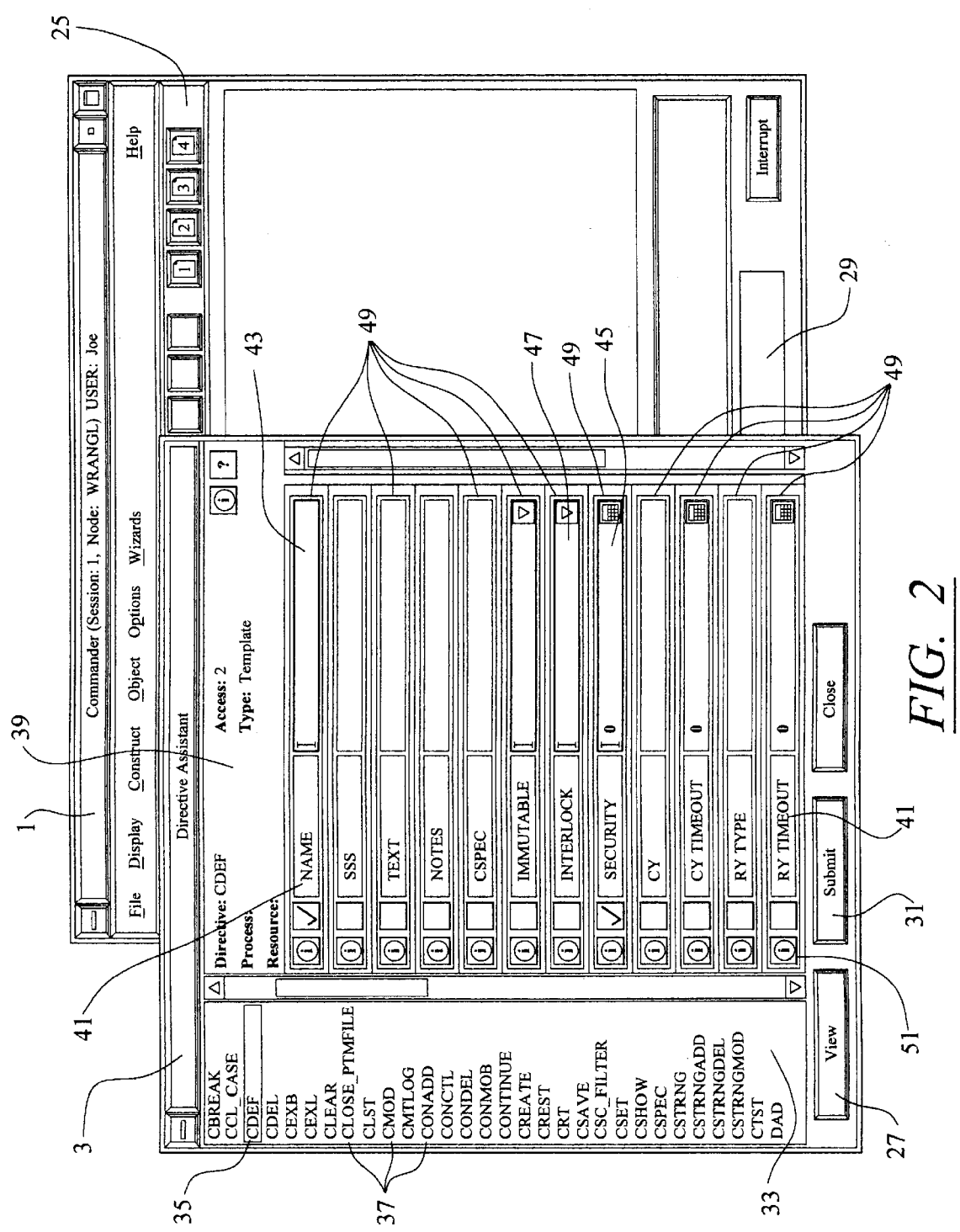
FIG. 2 is a screen shot of a visual syntax builder overlayed on a command and control session window.

In consequence of the distinction between directives and commands, in the preferred embodiment, upon invoking the visual syntax builder 3 the user can choose whether to format a directive or a command into a command string 5. Subsequently, in order to assist the user in preparing the command string 5, the visual syntax builder 3 can query either the command database 9A or the directive database 9B, as appropriate, in order to present to the user a valid selection of directives or commands, respectively. In either case, the visual syntax builder 3 can retrieve from the selected database 9A, 9B a list of valid directives or commands, as the case may be. Subsequent to retrieval, the list can be presented in the display of the visual syntax builder 3. FIG. 2 illustrates an exemplary screen shot of the visual syntax builder 3, shown as a "Directive Assistant". As shown in FIG. 2, the visual syntax builder 3 can be invoked by clicking on a button included in the tool bar 25 in the command and control session 1. However, the invention is not limited in this regard. Rather the visual syntax builder 3 can be invoked using any of several well-known methods in the art, for example command-line invocation or menu-bar selection.

Once invoked, the visual syntax builder 3 can display the available directives or commands 37 in a scrollable list of directives or commands 33. The user can select a directive or command contained in the scrollable list 33, as shown by example in FIG. 2. For example, in FIG. 2, the user has selected the "CDEF" directive 35. In response to the user's selection of a directive or command 37—in this case, a selected directive 35—the visual syntax builder 3 can retrieve from the appropriate database 9A, 9B—in this case directive database 9B—a directive or command template containing the operational parameters corresponding to the selected directive 35. In addition, the visual syntax builder 3 can present to the user in header area 39, basic information relating to the selected directive 35, for example the command or directive name and the command or directive type.

In the preferred embodiment, the directive or command template can include a list of corresponding operational parameters, an indication of valid values for each operational parameter and the data type of each operational parameter. During retrieval, the visual syntax builder 3 can prepare a linked list of each operational parameter and corresponding valid values and data types.

Once the visual syntax builder 3 has constructed the linked list of operational parameters and corresponding valid values and data types, the visual syntax builder 3 can proceed to analyze each. For each operational parameter analyzed, the visual syntax builder 3 can add an appropriate user interface element 49 to the parameter display area 51 of the visual syntax builder 3. In particular, the user interface elements 49 can include text fields 43, drop down boxes 47 and slider controls 45. Additionally, each user interface element 49 can include a label 41 identifying the operational parameter. Still, the invention is not limited in this regard. Rather, any user interface element 49 suitable for receiving or indicating values associated with the operational parameters can be incorporated in the present invention, for example a file browser control, calendar and clock controls and a directory browser control.

When all operational parameters in the linked list have been analyzed and, correspondingly, when appropriate user interface elements 49 have been added to the visual syntax builder 3, the visual syntax builder 3 can be refreshed and redisplayed. Specifically, the newly modified window representing the visual syntax builder 3 can be redrawn with the newly added user interface elements 49 using routine drawing commands provided with the underlying operating system API which are well-known in the art. Hence, in sum, the visual syntax builder 3 can dynamically conform its parameter display area 51 to a specified command or directive 35 by dynamically adding appropriate user interface elements 49 chosen according to operational parameters associated with the specified command or directive 35. As a result, the user can be provided maximum assistance in entering the specified command or directive 35.

Once redrawn, the visual syntax builder 3 can accept values in each of the user interface elements 49. When complete, the visual syntax builder 3 can permit the user to merely view a resulting formatted command string 5 by clicking the view button 27. Subsequently, the command string can be viewed in the command line field 29 of the command and control session 1. Alternatively, the user can directly execute the formatted command string 5 without first viewing the same by clicking the submit button 31.

Figure 3A:
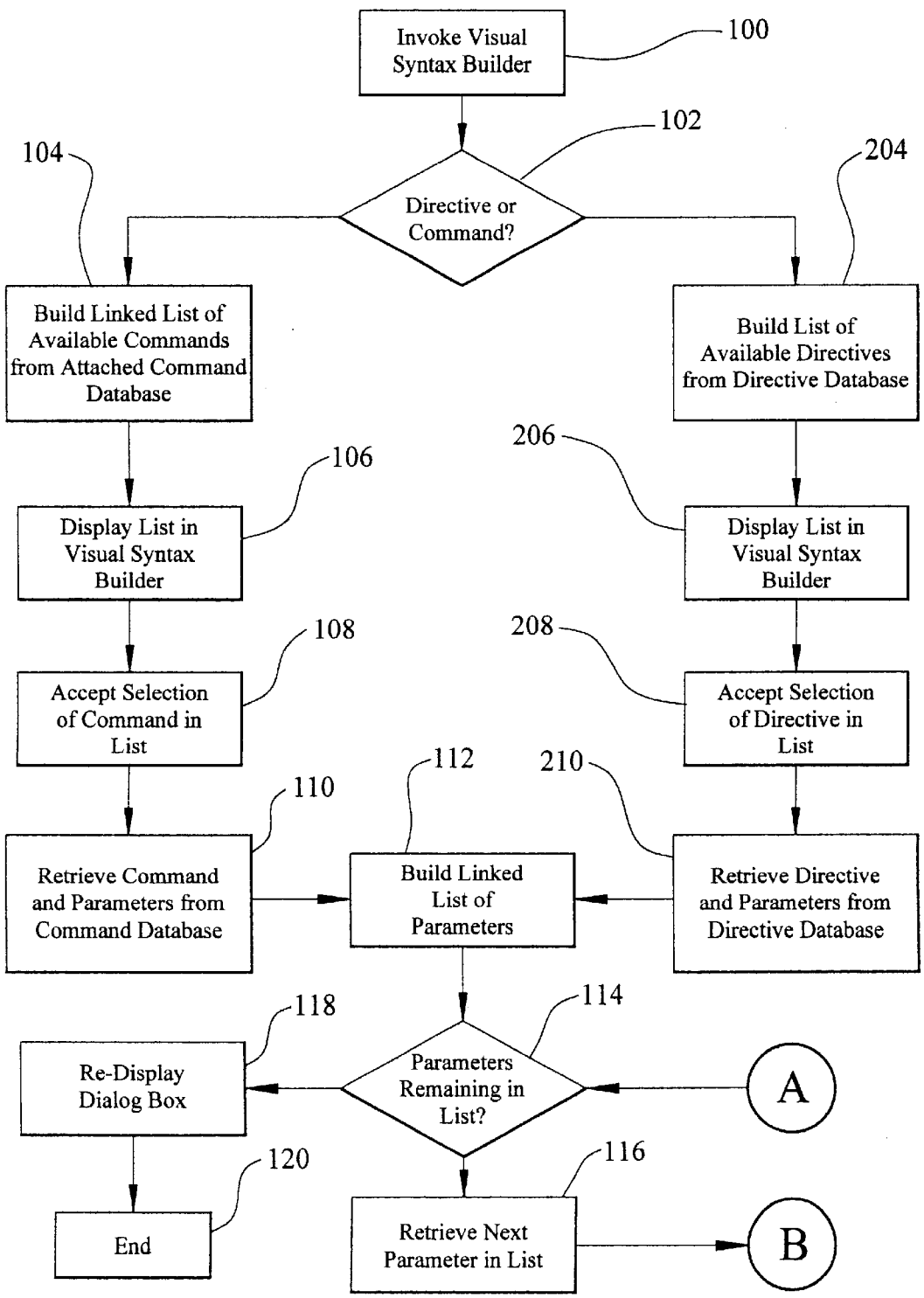
FIGS. 3A and 3B, taken together, are a flow chart illustrating a method for graphically assisting the command and control of a space vehicle control system.
Figure 3B:
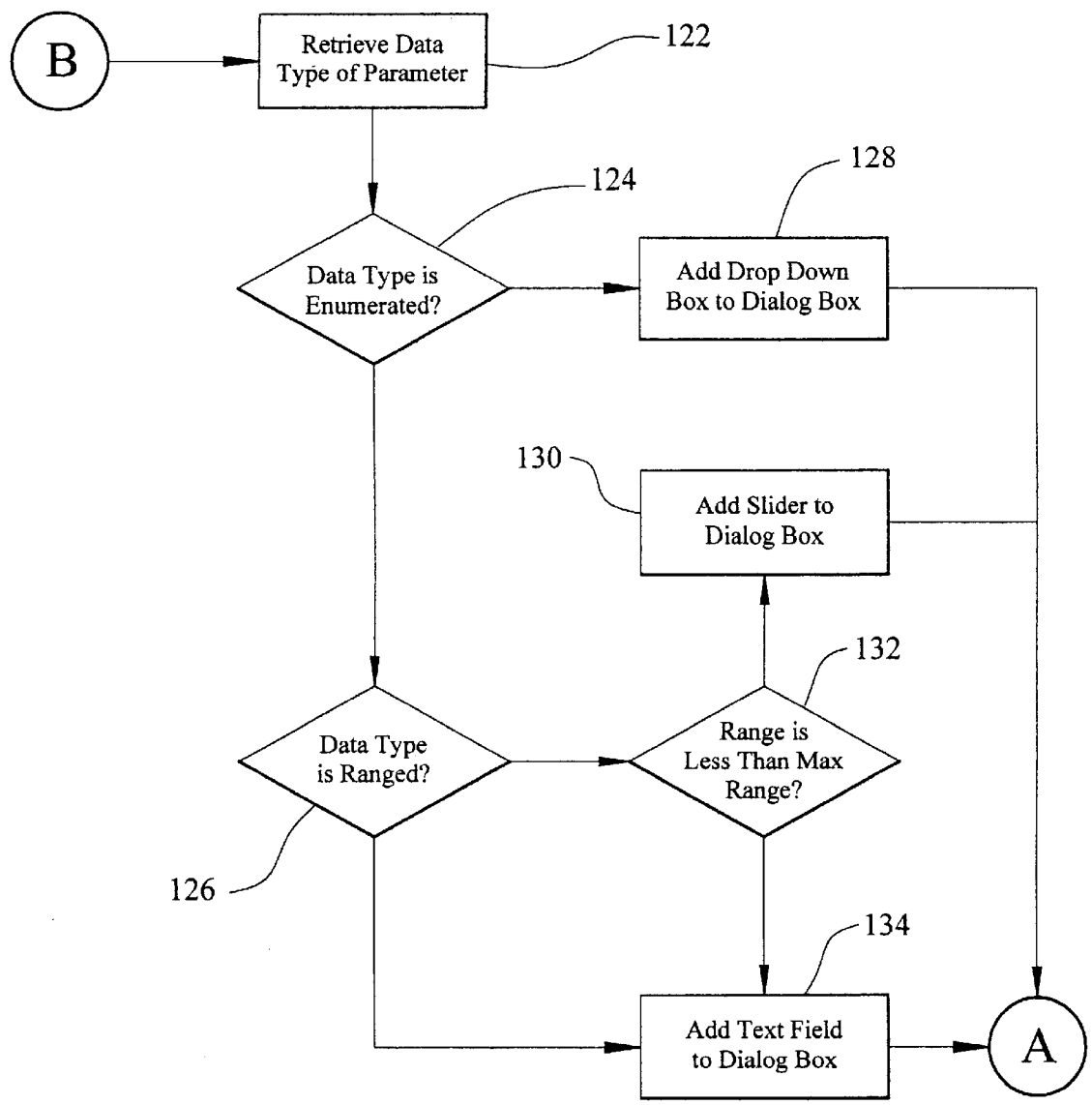

FIGS. 3A and 3B, taken together, illustrate a process for graphically assisting the command and control of a space vehicle system. As shown in FIG. 3A, the method begins in step 100 in which the user can invoke the visual syntax builder 3, preferably from the command and control session 1. If the user prefers assistance in formatting and executing a directive, in step 102, the user can specify the same. Alternatively, if the user prefers assistance in formatting and executing a command, the user can specify the same.

If the user has invoked the visual syntax builder 3 with regard to the formatting and execution of a command, in step 104, the visual syntax builder 3 can connect to the attached command database 9A and can build a linked list of available commands (or in the directive case, directives) 37 stored in the command database 9A. As discussed above, the command database 9A preferably includes commands 37 only associated with a particular target device 11. Thus, to command a different target device, in the preferred embodiment, it is necessary to first attach to a different command database prior to requesting assistance from the visual syntax builder 3 with regard to a command directed to the different target device. Notwithstanding, the invention is not limited in this regard. Rather, the invention can easily accommodate a single command database incorporating all commands, regardless of the target device. Likewise, the invention can accommodate the concurrent presence of multiple attached databases, each having stored therein, commands corresponding to different target devices.

Returning now to FIG. 3A, once the visual syntax builder 3 has constructed a linked list of available commands 37 in step 104, the list can be displayed in step 106 in the scrollable list 33 of the visual syntax builder 3. In step 108, the user can select one of the available commands 37 listed in the scrollable list 33 using a pointing device, keyboard or any other suitable selection method. Responsive to the user's selection of selected command 35, in step 110, the visual syntax builder 3 can identify the selected command 35 and can retrieve from the command database 9A, a command template containing a list of corresponding operational parameters, an indication of valid values for each operational parameter and the data type of each operational parameter. Still, the invention is not limited in this regard. Rather, the command template can contain any data relating to the formatting and execution of the selected command 35.

Returning momentarily to step 102, if the user has invoked the visual syntax builder 3 with regard to the formatting and execution of a directive, rather than a command, in step 204, the visual syntax builder 3 can connect to the directive database 9B and can build a linked list of available directives (or in the command case, commands) 37 stored in the command database 9B. Once the visual syntax builder 3 has constructed a linked list of available directives 37 in step 204, the list can be displayed in step 206 in the scrollable list 33 of the visual syntax builder 3. In step 208, the user can select one of the available directives 37 listed in the scrollable list 33 using a pointing device, keyboard or any other suitable selection method. Responsive to the user's selection of selected directive 35, in step 210, the visual syntax builder 3 can identify the selected directive 35 and can retrieve from the directive database 9B, a directive template containing a list of corresponding operational parameters, an indication of valid values for each operational parameter and the data type of each operational parameter. Still, the invention is not limited in this regard. Rather, the directive template can contain any data relating to the formatting and execution of the selected directive 35.

Regardless of whether the user has invoked the visual syntax builder 3 in relation to a directive or a command, in step 112, the visual syntax builder 3 can build a linked list of the operational parameters and the indication of the corresponding valid values and data types contained in either the command template or directive template, as the case may be. In steps 114 through 116, the visual syntax builder 3 can iterate through the linked list, examining each operational parameter for data type and valid values. In response to each operational parameter, the visual syntax builder can add to its display area 51 a user interface element 49, appropriate for the particular operational parameter and according to the corresponding data type and the indication of valid values. Once each operational parameter has been considered in steps 114 through 116, the visual syntax builder 3 can be redisplayed in step 118 by which the visual syntax builder 3 can display to the user the modified display area 51 containing an appropriate user interface element 49 for each operational parameter in the specified directive or command. Subsequently, the process terminates in step 120.

FIG. 3B illustrates in greater detail the process of adding a user interface element 49 for each operational parameter in the specified directive or command. Specifically, subsequent to retrieving the next operational parameter in the linked list in step 116, leading through jump circle B to step 122, the data type of the operational parameter can be retrieved. Using the data type of the operational parameter, the visual syntax builder 3 can add an appropriate user interface element 49 corresponding to the operational parameter. For example, in step 124, if the data type is an enumerated type, in step 128 a drop down box can be added to the display area 51 of the visual syntax builder 3. Alternatively, if the data type is ranged as determined in step 126, a slider control can be added to the display area 51 of the visual syntax builder in step 130. Finally, if the data type is a character string, as is considered the default case in the instant example, then in step 134 a text field can be added to the display area 51 of the visual syntax builder 3. Notwithstanding the above description, the present invention is not limited merely to drop down boxes, sliders and text fields. Rather any suitable user interface element can be associated with any particular data type to provide an appropriate user interface element for each data type.

Advantageously, the visual syntax builder 3 can ensure an appropriate addition of a selected user interface element 49 by cross-checking the selected user interface element 49 with the valid values indication, also included in the linked list of operational parameters. Specifically, whereas a slider control is a sensible user interface element for an operational parameter having a limited range of valid values, for instance 1 to 100, the slider control would be inappropriate for an operational parameter having an extended range of valid values, for instance –500,000 to 500,000. Hence, in step 132, the visual syntax builder can check the valid values indication to ensure that the permissible range of values associated with the operational parameter is less than a maximum value predetermined in the visual syntax builder 3. If the operational parameter range exceeds the maximum value, in step 134 a text field can be added to the display area 51 in place of the slider control. Still, the scope of the error checking performed by the visual syntax builder 3 is not limited to range checking. Rather, any suitable test for ensuring the addition of an appropriate user interface element in response to a particular data type in view of a corresponding indication of valid values can be incorporated in the present invention.

As described in the specification and illustrated in the drawings, a visual syntax builder in accordance with the inventive arrangements can be used for graphically assisting the user in entering directives and commands in a space vehicle control system. In particular, unlike a command line driven interface, a visual syntax builder in accordance with the inventive arrangements can reduce directive and command input errors by graphically presenting to the user valid operational parameters corresponding to a selected directive or command. Furthermore, the graphical presentation of the visual syntax builder can solicit acceptable values associated with each operational parameter by utilizing appropriate user interface elements according to an indication of valid values for each particular operational parameter.

While the foregoing specification illustrates and describes the preferred embodiments of this invention, it is to be understood that the invention is not limited to the precise construction herein disclosed. The invention can be embodied in other specific forms without departing from the spirit or essential attributes. Accordingly, reference should be made to the following claims, rather than to the foregoing specification, as indicating the scope of the invention.

What is claimed is:

1. In a remotely located vehicle command and control system, a method for graphically assisting system commanding comprising the steps of:

receiving a user-command selected from the group consisting of a command for externally commanding said remotely located vehicle and a directive for internally commanding a local control system for said remotely located vehicle;

retrieving from a database a record containing a template corresponding to said user-command, said template including at least one operational parameter corresponding to said user-command;

for each retrieved operational parameter in said template, adding to a graphical user interface (GUI) a GUI element corresponding to characteristics of said operational parameter;

displaying said GUI, said GUI being dynamically conformed to said user-command by adding to said GUI elements in accordance with characteristics of said operational parameters corresponding to said user-command;

formatting said user-command and at least one of said operational parameters into a command string for entering at least one of said command and said directive; and transmitting said command string to at least one object selected from the group consisting of said remotely located vehicle and said local control system.

2. The method according to claim 1, further comprising the steps of:

for each GUI element in said GUI, accepting a value; and, formatting said command string inclusive of said accepted values.

3. The method according to claim 1, further comprising the step of choosing to perform said retrieving step using at least one of a command database having stored therein said commands for externally commanding said remotely located vehicle and a directive database having stored therein said directives for internally commanding said local control system.

4. The method according to claim 1, further comprising the step of attaching a visual syntax builder to a database associated with a particular remotely located vehicle.

5. The method according to claim 1, wherein said accepting step comprises the steps of:

retrieving a list of user-commands from said database;

displaying said list in said GUI; and, permitting said user to select one of said user-commands in said list.

6. The method according to claim 1, wherein said template has a data type for each operational parameter; and, said characteristics upon which said GUI element is chosen include said data type.

7. The method according to claim 1, wherein said template has an indication of valid values for each operational parameter; and, said characteristics upon which said GUI element is chosen include said indication of valid values.

8. The method according to claim 1, wherein said user interface elements comprise drop down boxes, sliders and text fields.

9. The method according to claim 2, further comprising the step of visually presenting said formatted command string to said user.

10. The method according to claim 2, further comprising the step of automatically executing said formatted command string.

11. A system for graphically assisting the formatting of a command string in a remotely located vehicle command and control system comprising:

a database for storing user-commands, said user commands selected from the group consisting of commands for externally commanding said remotely located vehicle and directives for internally commanding a local control system for said remotely located vehicle, at least one of said stored user-commands having at least one operational parameter;

a graphical user interface (GUI); and, at least one GUI element selected for addition to said GUI for accepting a value corresponding to an operational parameter associated with a selected user-command in said database;

said GUI element selected according to characteristics of said corresponding operational parameter.

12. The system according to claim 11, further comprising a user-command formatter for formatting a command string containing said user-command and said accepted user-command value.

13. The system according to claim 11, wherein said database comprises templates, each template comprising a user-command and at least one operational parameter corresponding to said user-command.

14. The system according to claim 13, wherein said template further comprises a data type for each operational parameter; and, said characteristics upon which said GUI element is selected include said data type.

15. The system according to claim 13, wherein said template further comprises an indication of valid values for each operation parameter; and, said characteristics upon which said GUI element is chosen include said indication of valid values.

16. The system according to claim 13, wherein said GUI element is selected from the group consisting of drop down boxes, sliders and text fields.

17. The system according to claim 12, further comprising a GUI for visually presenting said formatted command string to a user.

18. The system according to claim 12, further comprising means for automatically executing said formatted command string.

19. In a remotely located vehicle command and control system, a machine readable storage, having stored thereon a computer program for graphically assisting system commanding, said computer program having a plurality of code sections executable by a machine for causing the machine to perform the steps of:

receiving a user-command selected from the group consisting of a command for externally commanding said remotely located vehicle and a directive for internally commanding a local control system for said remotely located vehicle;

retrieving from a database a record containing a template corresponding to said user-command, said template including at least one operational parameter corresponding to said user-command;

for each retrieved operational parameter in said template, adding to a graphical user interface (GUI) a GUI element corresponding to characteristics of said operational parameter;

displaying said GUI, said GUI being dynamically conformed to said user-command by adding to said GUI elements in accordance with characteristics of said operational parameters corresponding to said user-command;

formatting said user-command and at least one of said operational parameters into a command string for entering at least one of said command and said directive; and transmitting said command string to at least one object selected from the group consisting of said remotely located vehicle and said local control system.

20. The machine readable storage according to claim 19, further comprising the steps of:

for each GUI element in said GUI, accepting a value; and, formatting said command string inclusive of said accepted values.

21. The machine readable storage according to claim 19, further comprising the step of choosing to perform said retrieving step using at least one of a command database having stored therein said commands for externally commanding said remotely located vehicle and a directive database having stored therein said directives for internally commanding said local control system.

22. The machine readable storage according to claim 19, further comprising the step of attaching a visual syntax builder to a database associated with a particular remotely located vehicle.

23. The machine readable storage according to claim 19, wherein said accepting step comprises the steps of:

retrieving a list of user-commands from said database;

displaying said list in said GUI; and, permitting said user to select one of said user-commands in said list.

24. The machine readable storage according to claim 19, wherein said template has a data type for each operational parameter; and, said characteristics upon which said GUI element is chosen include said data type.

25. The machine readable storage according to claim 19, wherein said template has an indication of valid values for each operational parameter; and, said characteristics upon which said GUI element is chosen include said indication of valid values.

26. The machine readable storage according to claim 19, wherein said user interface elements comprise drop down boxes, sliders and text fields.

27. The machine readable storage according to claim 20, further comprising the step of visually presenting said formatted command string to said user.

28. The machine readable storage according to claim 20, further comprising the step of automatically executing said formatted command string.

29. In a remotely located vehicle command and control system, a method of dynamically conforming a GUI to a specified user-command and corresponding operational parameters comprising the steps of:

retrieving from a database a record comprising at least one operational parameter and at least one of a command for externally commanding said remotely located vehicle and a directive for internally commanding a local control system for said remotely located vehicle;

dynamically assembling a graphical user interface (GUI) according to said retrieved record by adding to said GUI for each operational parameter in said record a GUI element corresponding to characteristics of said operational parameter; and, displaying said GUI.

30. The method according to claim 29, further comprising the step of attaching a visual syntax builder to a database associated with a particular remotely located vehicle.

31. The method according to claim 29, wherein said record further comprises a data type for each operational parameter; and, said characteristics upon which said user interface element is chosen include said data type.

32. The method according to claim 29, wherein said record further comprises an indication of valid values for each operational parameter; and, said characteristics upon which said user interface element is chosen include said indication of valid values.

33. The method according to claim 29, wherein said user interface elements comprise drop down boxes, sliders and text fields.

\* \* \* \* \*